(No Model.)
P. F. DEWEY.
ODORLESS EXCAVATING APPARATUS.
No. 336,902. Patented Mar. 2, 1886.
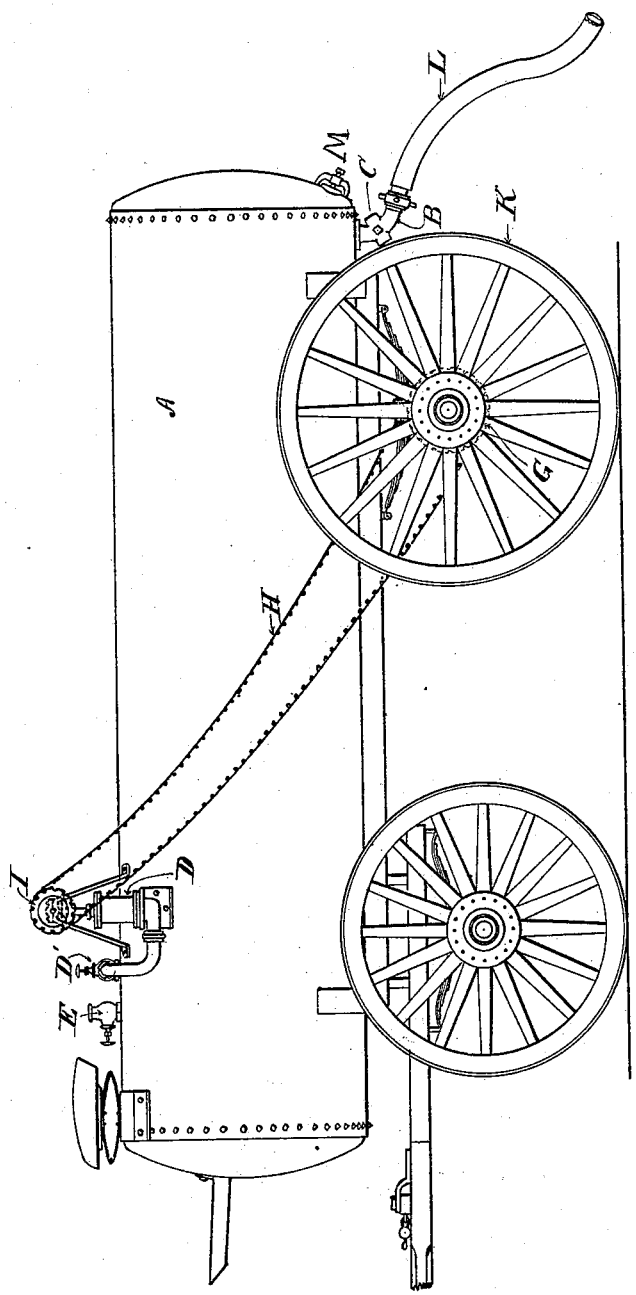
Witnesses
H. N. Peck
Richard Poul
Inventor
Phinney P. Dewey
By A. C. Paul
Atty.

United States Patent Office.

PLINNEY F. DEWEY, OF MINNEAPOLIS, MINNESOTA, ASSIGNOR OF ONE-HALF TO CHARLES L. DEWEY, OF SAME PLACE.

ODORLESS EXCAVATING APPARATUS.

SPECIFICATION forming part of Letters Patent No. 336,902, dated March 2, 1886.

Application filed October 16, 1885. Serial No. 180,072. (No model.)

*To all whom it may concern:*

Be it known that I, PLINNEY F. DEWEY, a citizen of the United States, and a resident of Minneapolis, in the county of Hennepin and State of Minnesota, have invented certain Improvments in Odorless Excavating Apparatus, of which the following is a specification.

My invention relates to an improved apparatus for expeditiously removing material from privy-vaults or cesspools; and my invention consists, generally, in the construction and combination hereinafter described, and pointed out in the claim.

The drawing forming part of this specification represents a side elevation of my apparatus.

A represents an air-tight metal tank, preferably formed of metal riveted together. This tank is mounted on a suitable carriage, and it has a pipe, B, attached, preferably beneath the rear end of the tank, as shown. The pipe B is provided with a cut-off valve, C, by which it may be closed air-tight, and with a half-coupling, so that a hose, L, may be attached thereto and its opposite end inserted into a cesspool that is to be cleared.

D represents an air-pump of suitable construction mounted on the tank, preferably over the forward end, as shown, and arranged to pump the air from the interior of the tank. This pump is provided with a sprocket-wheel, I. The hub of one of the rear wheels is also provided with a sprocket-wheel, G, and a drive-chain, H, connects the two sprocket-wheels.

E is an air-inlet, by which the air may be admitted to the tank.

The operation of the device is as follows: After the tank has been emptied at the dump the valves C and E are closed and the air-pump connected with the gearing. The apparatus is then driven to the vault that is next to be cleared. During this journey the revolution of the wheel K operates the pump D through the gearing G H I, and by the time the vault is reached the air will be nearly all pumped out of the tank. The end of the tube L is inserted into the vault, the valve C is opened, and by the atmospheric pressure the liquid and semi-liquid material in the vault is driven into the tank. As soon as the vault is cleared, or as much material is in the tank as will enter it, the valve C is closed, the air-pump is disconnected, and the carriage is driven to the place where the material is to be dumped, where the valves C and E are opened and the material allowed to run out.

With this apparatus one man is able to do all the necessary work, and the laborious process of pumping out the vaults by hand-pumps is avoided. If the air is not sufficiently exhausted by the time the apparatus is brought to the vault that is to be cleaned, the wheel K may be jacked up and rotated to further drive the pump, or the pump may be worked by hand until a vacuum is obtained.

A suitable clutch may be provided, by means of which the air-pump may be disconnected from the gear.

The gearing between the carriage-wheel K and the air-pump may be varied somewhat without departing from my invention. A cut-off valve between the air-pump and the tank is also preferably provided.

If desired, two pumps may be provided, one being driven from each of the wheels K.

A suitable man-hole, M, may be provided in the rear end of the tank. A vacuum-gage may also be attached to the tank.

I claim as my invention—

The combination, with the air-tight tank A, mounted on a carriage having the wheel K, provided with a sprocket-wheel, G, of the air-pump D, sprocket-wheel I, drive-chain H, valve E, pipe B, valve C, and hose L, all substantially as described, and for the purpose set forth.

In testimony whereof I have hereunto set my hand this 9th day of October, 1885.

PLINNEY F. DEWEY.

Witnesses:
C. L. DEWEY,
A. C. PAUL.